United States Patent [19]

Gordon

[11] Patent Number: 4,467,404
[45] Date of Patent: Aug. 21, 1984

[54] REFLECTOR FOR SPOKED WHEEL

[76] Inventor: Jack J. Gordon, 2925 Pemba Dr., Costa Mesa, Calif. 92626

[21] Appl. No.: 326,018

[22] Filed: Nov. 30, 1981

[51] Int. Cl.³ ............................................. F21V 7/00
[52] U.S. Cl. .................................. 362/346; 362/347;
362/396; 362/72; 362/78; 362/806; 301/37 CM; 350/97
[58] Field of Search ................... 362/72, 78, 347, 350,
362/806, 61, 80, 296; 350/97, 99; 301/37 CM;
D26/124, 125

[56] References Cited

U.S. PATENT DOCUMENTS

| | | | |
|---|---|---|---|
| 1,791,093 | 2/1931 | Shryock | 301/37 CM |
| 3,610,916 | 10/1971 | Meehan | 362/363 |
| 3,947,070 | 3/1976 | Brilando et al. | 350/97 X |
| 4,135,229 | 1/1979 | Modurkay | 362/72 |
| 4,174,532 | 11/1979 | Kelley | 362/102 |
| 4,194,809 | 3/1980 | Campagna, Jr. | 350/97 |
| 4,201,448 | 5/1980 | Kagayama | 350/97 |
| 4,225,848 | 9/1980 | Roberts | 362/72 X |

FOREIGN PATENT DOCUMENTS

| | | | |
|---|---|---|---|
| 3047435 | 10/1981 | Fed. Rep. of Germany | 362/72 |
| 1441201 | 6/1976 | United Kingdom | 362/72 |

Primary Examiner—Peter A. Nelson
Attorney, Agent, or Firm—Harvey C. Nienow

[57] ABSTRACT

A three dimensional reflective device for attachment to an individual spoke of a spoked wheel includes a pair of matched and mating reflective elements which are attached to each other and to the spoke by a spoke-retention assembly which is completely enclosed by the reflective elements when the device is installed. The spoke-retention assembly includes a pin having a passage to accommodate the spoke, and a locking element which locks the spoke firmly to said pin within the passage. The pin is frictionally retained in a pair of bearing members projecting from the interiors of the reflective elements. Retention of the pin in the bearing members results both in the attachment of the reflective elements to each other, and in the securing of the locking element in its locking position, thereby firmly securing the entire device to the spoke.

25 Claims, 7 Drawing Figures

REFLECTOR FOR SPOKED WHEEL

BACKGROUND OF THE INVENTION

The present invention relates generally to the field of display devices adapted for attachment to a spoked wheel. More particularly, the invention relates to reflective assemblies adapted for attachment to an individual spoke of such a wheel.

Reflective devices for attachment to a spoked wheel, particularly bicycle wheels, are well known in the art. Such devices are gaining in commercial importance due to growing concerns for safety, especially in the area of increasing the visibility of bicycle riders in the dark.

Several important considerations go into the design of such devices. For example, such devices must be capable of being securely fastened to a wheel spoke, such that the centrifugal force from the wheel's rotation will not displace the device from its desired position on the spoke. Such fastening must also be secure enough so that the device will not be loosened or lost due to the jolts experienced by the wheel. Often working against considerations of security is the desire to allow such devices to be quickly and easily installed. Also, the fastening means should, advantageously, be made as unobtrusive, visually, as possible, so as to maximize the reflective area of the device.

The approach taken by the prior art is typified by the devices disclosed in U.S. Pat. Nos. 3,820,852, 4,037,925 and 4,201,448. In such devices, a pair of substantially flat reflective elements are fastened together back-to-back on opposite sides of a bicycle spoke so as to present a reflective surface on either side of the wheel. The fastening mechanism includes a threaded element, such as a screw or a bolt, which is visible from at least one side of the device.

While such devices generally yield satisfactory results, they are prone to several disadvantages. First, the security of the devices on the spoke is generally dependent upon the tightness of the screw or bolt. Such devices frequently are installed by children who may lack the strength to tighten the screw or bolt sufficiently. In addition, such devices frequently require a degree of manual dexterity for installation which may be lacking in some children. Finally, such devices, when installed, present but two reflective surfaces, visible only from the sides of the wheel, at least one of these surfaces being interrupted by the fastening screw or bolt. The overall effect of such an arrangement is to detract from the visibility of such devices.

Thus, it can be seen that it would be advantageous to provide a reflective device which can be easily and quickly installed on a wheel spoke with a minimum of strength and manual dexterity, but which, nevertheless, provides the requisite degree of security to stay in place through prolonged use. Another advantage is to provide such a device with a reflective surface which is highly visible from all directions, and which is substantially uninterrupted by the fastening mechanism.

SUMMARY OF THE INVENTION

Broadly, the present invention is a reflector which comprises a pair of matched and mating reflective elements which are fastened to each other and to a wheel spoke by means of a spoke-retention assembly which is completely enclosed by the reflective elements when the reflector is attached to a spoke. More particularly, the spoke-retention assembly of the present invention includes a pin retained in a pair of bearing members projecting from the interior surface of the two mating reflective elements. The pin has a central transverse passage accessed by a longitudinal slot through one end of the pin, so that when the other end of the pin is inserted into one of the bearing members, a spoke can be lodged in a transverse groove in the passage. Completing the spoke-retention assembly is a locking member which is configured so as to be accommodated, with a close friction fit, by the passage and slot of the pin. The locking member has camming surfaces which engage cooperating surfaces in the passage to wedge the locking member tightly into the passage and the slot, while also firmly capturing the spoke in a channel formed by the aforementioned transverse groove and an aligned groove in an opposing surface of the locking member.

When the locking member has been emplaced as described, the slotted free end of the pin has an external configuration and dimensions identical to those of the end previously inserted into the bearing member of the first reflective element. The free end of the pin is now inserted into the bearing member of the second reflective element, which is pushed toward the first reflective element, thereby strengthening the engagement between the locking member and the pin. Thus, when the two reflective elements are co-engaged, the spoke is firmly captured by the spoke-retention assembly so as to prevent any significant movement therebetween, while the two reflective elements mate to provide a uniform, uninterrupted spherical reflective surface which completely encloses the spoke-retention assembly. It will be appreciated that the spoke-retention assembly thus provides the dual function of fastening the two reflective elements to each other, and of fastening these elements firmly to the spoke.

Another feature of the invention is the provision of alignment means in the reflective elements and their associated bearing members, as well as in the pin and the locking member, which assures the proper alignment of all of the assembled members with respect to each other and to the spoke.

As will be more clearly understood from the detailed description which follows, the present invention overcomes the previously discussed shortcomings of the prior art by providing a reflector assembly which requires no screws, bolts, or other external fastening devices, yet which allows a firm and secure fastening of the reflector components to one another and to the spoke. Moreover, the structure of the invention allows quick and easy assembly, installation, and removal with a minimum of strength and manual dexterity. In a real sense, the structure is self-fastening to the spoke. In addition, when the reflector is installed, all of the fastening components are completely enclosed within the reflective elements, thereby providing a reflective surface which is unmarred by fastening means, while being visible from all directions. Finally, the structure of the invention allows for economical manufacture from a material such as plastic, and yet it requires no chemical bonding agents for assembly and installation, as might otherwise be deemed necessary for a structure formed from a plastic material.

DETAILED DESCRIPTION OF THE INVENTION

Figure 1:
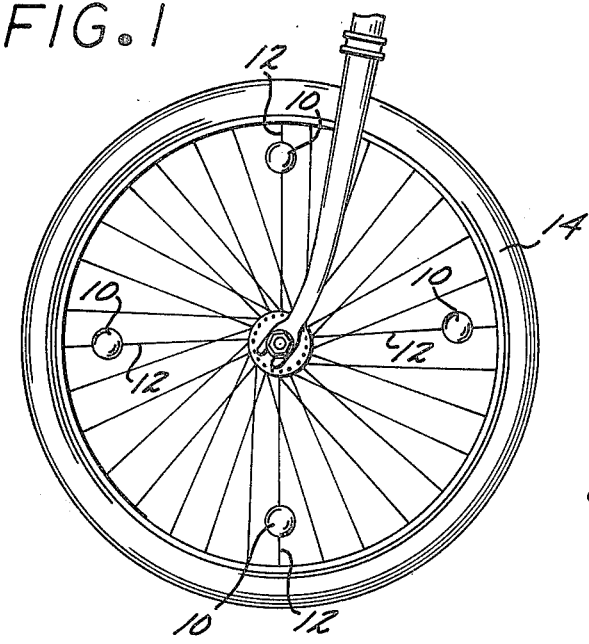
FIG. 1 is an elevational view showing four reflectors, in accordance with the present invention, attached to the spokes of a bicycle wheel.
Figure 2:
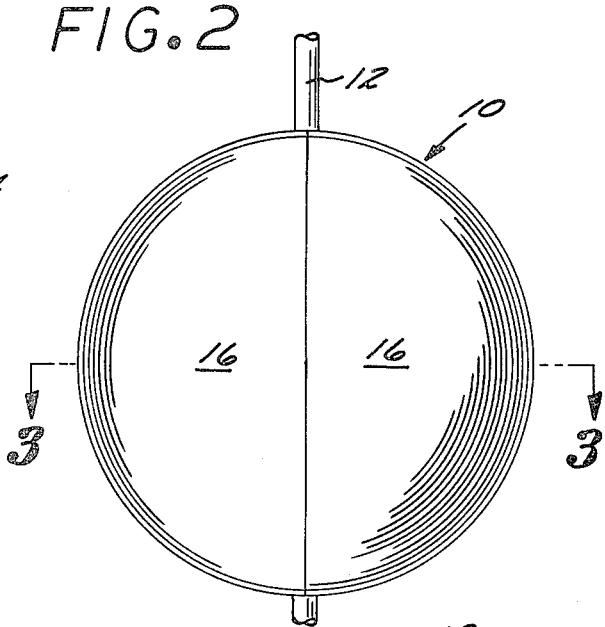
FIG. 2 is an elevational view of a reflector, in accordance with the present invention, showing the exterior thereof, as attached to a wheel spoke.

Referring to the drawings, the numeral 10 denotes a reflector in accordance with the present invention. As shown in FIG. 1, four such reflectors 10 are shown, each attached to a separate spoke 12 of a bicycle wheel 14. As illustrated in FIG. 2, the invention, in its preferred embodiment, consists of a mated pair of hemispherical reflective elements 16, which together form a spherical reflective surface. While a hemispherical configuration for the elements 16 may be preferred, it should be noted that other shapes may be used if, for example, a square or oval reflective surface is desired.

Preferably, the reflective elements 16 may be of a transparent or translucent material such as plastic, with a reflective prismatic surface formed on the interior surface. Alternatively, the reflective elements 16 may be of a plastic material with a reflective surface formed on the exterior surface.

Figure 4:
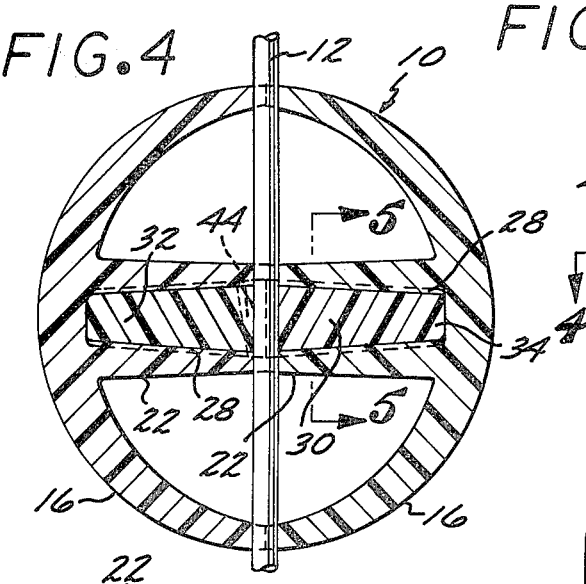
FIG. 4 is a cross-sectional view along line 4—4 of FIG. 3.
Figure 3:
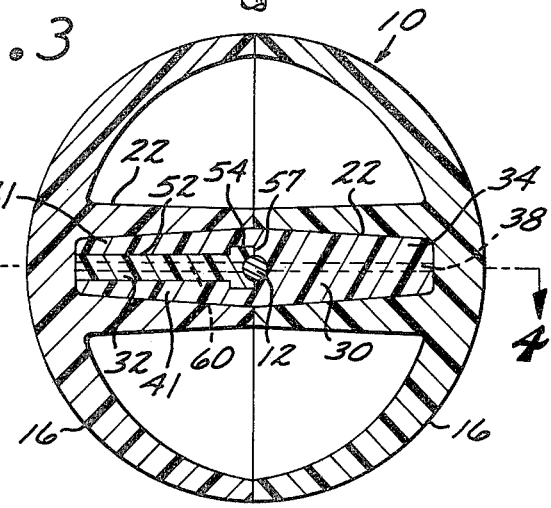
FIG. 3 is a cross-sectional view along line 3—3 of FIG. 2.
Figure 5:
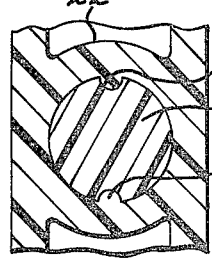
FIG. 5 is a fragmentary cross-sectional view along line 5—5 of FIG. 4.
Figure 7:
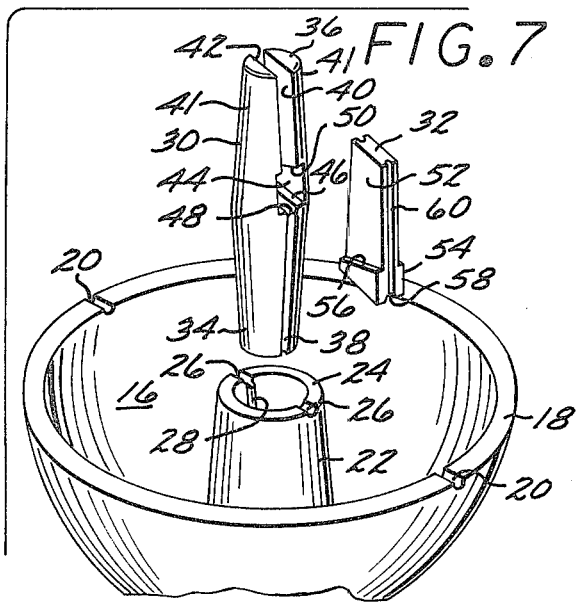
FIG. 7 is an exploded perspective view of the spoke-retention assembly with one of the two hemispherical reflective elements used in the preferred embodiment of the invention.

As best shown in FIG. 7, each of the hemispherical reflective elements 16 has a peripheral edge 18 with a pair of diametrically opposed radial grooves 20, the latter suitably dimensioned to accommodate a spoke 12. (For the sake of clarity, only one reflective element 16 is shown in FIG. 7; the other is identical.) Extending radially inwardly from the interior surface of the reflective element is a hollow central bearing member or socket 22, terminating in a peripheral edge 24, the latter being substantially coplanar with the edge 18 of the reflective element 16. The edge 24 has a pair of diametrically opposed radial grooves 26 in alignment with the grooves 20, and, likewise, being suitably dimensioned to accommodate a spoke 12. The exterior of the bearing member 22 may be cylindrical, or, as shown, slightly tapered inwardly from its base to the edge 24 (see FIGS. 3 and 4). The interior of the bearing member 22, as best shown in FIGS. 3 and 4, tapers outwardly from the base to the edge 24. As shown in FIGS. 5 and 7, the interior of the bearing member 22 is provided with a pair of diametrically opposed longitudinal tongues 28.

Shown most clearly in FIG. 7 is a spoke retention assembly comprising a pin 30 and a locking wedge 32. The pin 30 has a double-tapered shape so that each of its ends 34 and 36 is snugly engaged by the interior surface of one of the bearing members 22, as seen in FIG. 3. The two ends 34, 36 of the pin 30 differ somewhat in configuration, with one end 34 being substantially solid and bearing a pair of diametrically opposed longitudinal grooves 38 which mate with the tongues 28 of one of the bearing members 22, and with the other end 36 having a cut-out portion 40 which accommodates the locking wedge 32 as will be presently described. The cut-out portion 40 thus divides the pin end 36 into a pair of spaced-apart longitudinal fingers 41.

Again referring primarily to FIG. 7, the cut-out portion 40 of the pin 30 includes a deep longitudinal slot 42 communicating with a central lateral passage 44, both the slot 42 and the passage 44 traversing the entire diameter of the pin 30. The passage 44 is defined by a substantially level surface 46 having a transverse groove 48, suitably dimensioned to accommodate a spoke 12, and a pair of inclined shoulders 50, spaced from and opposed to the surface 46. The surface 46 and the shoulders 50 provide a substantially wedge-shaped configuration for the passage 44, as best shown in FIG. 6.

The locking wedge 32, as shown in FIG. 7, is dimensioned for a snug fractional fit with the slot 42 and the passage 44. Thus, the wedge 32 has a first portion 52 having a width substantially the same as that of the slot 42, and a second portion 54 with a width substantially the same as that of the passage 44. The portion 54 has a pair of parallel, inclined shoulders 56 which give the portion 54 a wedge shape which allows a close tolerance, mating fit with the passage 44 when the locking wedge 32 is inserted into the cut-out portion 40, with the shoulders 56 of the locking wedge 32 engaging the shoulders 50 of the passage 44. The relationship between the locking wedge second portion 54 and the passage 44 is most clearly shown in FIG. 6, from which it can be seen that, due to the substantially identical angles of their respective shoulders 50 and 56, the passage 44 and the wedge portion 54 have approximately the same axial dimensions.

Figure 6:
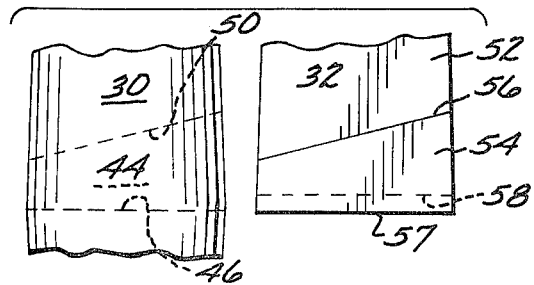
FIG. 6 is a detailed, fragmentary exploded view of the spoke-retention assembly used in the preferred embodiment of the present invention.

Referring to FIGS. 3, 6 and 7, the locking wedge second portion 54 is seen to terminate in a surface 57 provided with a transverse groove 58, suitably dimensioned to accommodate a spoke 12. It can thus be seen that, when the locking wedge 32 is inserted into the cut-out portion 40, a spoke-retaining channel is defined by the grooves 48 and 58. Also, as best shown in FIG. 7, the locking wedge 32 is provided with a groove 60 along the length of each of its narrow longitudinal edges. When the locking wedge 32 is inserted into the cut-out portion 40 of the pin 30, the grooves 60 are aligned with the grooves 38 in the solid end 34 of the pin 30. Like the grooves 38, the grooves 60 engage the longitudinal tongues 28 in the bearing member 22 of the other of the pair of hemispherical reflective elements 16.

It will be appreciated from the foregoing that, when the locking wedge 32 is inserted into the cut-out portion 40 of the pin 30, the exterior surfaces of the pin ends 34 and 36 will be substantially identical, and the pin end 36 will provide the same tight frictional fit with the bearing member 22 of one reflector 16 as will the pin end 34 with the bearing member 22 of the other reflector 16, as shown most clearly in FIGS. 3 and 4.

To install the reflector 10 on a spoke 12, the solid end 34 of the pin 30 is inserted into the bearing member 22 of one of the reflective elements 16. Such insertion requires the alignment and engagement of the pin grooves 38 with the bearing member tongues 28, thereby providing a fit of the pin 30 into the bearing member 22 which provides the proper alignment of the spoke-retention groove 48 in the pin passage 44 with the radial spoke-retention grooves 20 in the reflective element 16, and with the spoke-retention grooves 26 in the bearing member 22. The pin end 34 is tightly held in the bearing member 22 by a close friction fit, and by the engagement between the tongues 28 and the grooves 38.

The assembled pin 30 and one reflective element 16 are then placed on a spoke 12 by passing the spoke 12 through the cut-out portion 40 in the pin end 36 until the spoke 12 rests in the groove 48. Because of the alignment of the grooves 48,20 and 26, the spoke 12 will be retained in these grooves.

Next, the locking wedge 32 is inserted into the cut-out portion 40. As the wedge 32 is inserted, the inclined shoulders 56 on the wedge portion 54 cooperate with the inclined shoulders 50 in the pin passage 44 to create a camming action which urges the wedge surface 57 toward the passage surface 46, thereby firmly retaining the spoke 12 in the spoke-retention channel formed by the wedge groove 58 and the channel groove 48. The abutment between the wedge shoulders 56 and the passage shoulders 50 also restrains the locking wedge 32 against axial movement relative to the pin 30. The result of the relationship between the pin 30 and the locking wedge 32 is that the spoke 12 is firmly locked in place with sufficient force to prevent a free sliding of the spoke through the channel formed by the grooves 48 and 58.

Finally, the end 36 of the pin 30 is inserted into the bearing member 22 of the second hemispherical reflector element 16. Because the previous insertion of the locking wedge 32 into the cut-out portion 40 of the pin 30, in essence, "completed" the pin end 30 so as to make its exterior configuration and dimensions substantially identical to the other pin end 34, the pin end 36 is firmly retained in its associated bearing member 22 by the same mechanism as that which applies to the pin end 34 and its associated bearing member 22, with the longitudinal wedge grooves 60 performing the same function as the pin grooves 38, previously described.

Thus, also, the second hemispherical reflective element 16 is automatically properly oriented so that the spoke 12 becomes seated in its radial grooves 20 and 26, which thus form a channel for the spoke 12 with the grooves 20 and 26 of the first reflective element. Moreover, the insertion of the pin end 36 into its associated bearing member 22 causes the longitudinal fingers 41 to be urged tightly against the locking wedge 32, thereby providing a secure locking relationship between the locking wedge 32 and the pin 30, and between the spoke-retention assembly (pin 30 and wedge 32) and the spoke 12.

Thus, as described above, the invention provides a reflector which is quickly and easily installed on a wheel spoke in a manner which substantially prevents its movement along the spoke. This ability to lock onto the spoke is provided without the use of screws, bolts or the like. Moreover, the elements of the reflector are firmly fastened together without the need for glue or mechanical fastening means, thereby allowing quick assembly and disassembly. Also, the unique fastening mechanism of the invention is completely hidden when the reflector is installed, thereby enhancing the aesthetic qualities. The unique configuration of the invention provides a three-dimensional reflective surface, uninterrupted by fastening elements, thereby enhancing the visibility of the reflector from all directions. In this regard, it is contemplated that the two hemispherical elements which make up a given reflector might be of different reflective colors so as to provide a multi-color view in certain directions, thereby enhancing the attractiveness and providing a safer condition by being quickly and easily noticed.

What is claimed is:

1. A reflector for attachment to a spoke of a spoked wheel, comprising;
    first and second mating reflective elements defining a continuous reflective surface,
    a bearing member for each of said elements extending therefrom, and spoke-retention means associated with said bearing means for securely attaching said elements to each other and to sad spoke, said spoke-retention means comprising a pin held in said bearing members and containing access means therein to allow a spoke to be seated therein.

2. The reflector of claim 1, wherein each of said first and second elements is a substantially hemispherical reflective element.

3. The reflector of claim 1, wherein each of said first and second reflective elements is formed with an interior surface from which the respective bearing member radially extends.

4. The reflector of claim 3 wherein said spoke-retention means comprises:
    an elongated pin having a first end adapted to be held in a first one of said bearing members and a second end adapted to be held in the second one of said bearing members, said pin having a lateral central passage;
    access means in said pin for allowing said spoke to be seated in said passage; and
    locking means, insertable into said passage, for locking said pin to said spoke.

5. The reflector of claim 4, wherein said access means comprises a longitudinal slot in one of said first and second pin ends communicating with said passage.

6. The reflector of claims 3, 4 or 5, further comprising alignment means, associated with said spoke-retention means and said reflective elements, for aligning said spoke-retention means and said reflective elements with each other and with said spoke.

7. The reflector of claims 4 or 5, further comprising camming means on said pin in said passage and on said locking means, for urging said locking means firmly against said spoke as said locking means is inserted into said passage when said spoke is seated therein.

8. The reflector of claims 4 or 5, wherein said first and second reflective elements each has a peripheral edge, and further comprising:
    first and second diametrically opposed radial grooves in each of said peripheral edges, said grooves dimensioned to accommodate said spoke;
    third and fourth diametrically opposed radial grooves in each of said bearing members, aligned with said first and second grooves, and dimensioned to accommodate said spoke; and
    alignment means, on said pin and in said bearing members, for aligning said passage with said first, second, third and fourth grooves when one of said first and second pin ends is retained in one of said bearing members.

9. The reflector of claim 8 wherein said passage has a fifth groove, said alignment means aligns said fifth groove with said first, second, third and fourth grooves when said one of said pin ends is retained in said one of said bearing members, and said locking means has a sixth groove which forms a channel for the retention of said spoke with said fifth groove when said locking means is inserted into said passage.

10. The reflector of claim 7 wherein said camming means comprises:
a first inclined surface on said pin in said passage; and
a second inclined surface on said locking means;
whereby said first and second inclined surfaces cooperate with each other as said locking means is inserted into said passage, thereby to urge said locking means against said spoke.

11. A reflector for attachment to a spoke of a spoked wheel, comprising:
first and second substantially hemispherical reflective elements, each having a peripheral edge and dimensioned to form a substantially spherical reflective surface when joined along their respective peripheral edges;
bearing members for each of said elements extending therefrom;
and spoke-retention means associated with said bearing means for securely attaching said elements to each other and to said spoke, said spoke-retention means comprising a pin held in said bearing members and containing access means therein to allow a spoke to be seated therein.

12. The reflector of calims 1 or 11 wherein said bearing means includes first and second sockets on the interior surfaces of said first and second reflective elements, respectively, and said spoke-retention means comprises:
a pin having first and second ends dimensioned for firm retention in said first and second sockets, respectively;
passage means in said pin for allowing the passage of said spoke transversely therethrough; and
locking means, engageable with said passage means, for locking said spoke in place in said passage means.

13. The reflector of claim 12 wherein said passage means includes a longitudinal slot through one of said first and second ends of said pin, and said locking means comprises a locking element configured to conform closely with the interior dimensions of said slot.

14. The reflector of claim 13 wherein said locking element is so configured that said first and second ends of said pin have substantially identical external dimensions when said locking element is inserted into said slot.

15. The reflector of claim 13 further comprising camming means, in said passage means and on said locking means, for urging said locking means firmly against said spoke as said locking means is engaged with said passage means when said spoke is in place therein.

16. The reflector of claim 15 wherein said camming means comprises:
a first inclined surface on said pin in said passage means; and
a second inclined surface on said locking means;
whereby said first and second inclined surfaces are inclined at approximately the same angles, so as to cooperate with each other as said locking means is inserted into said passage means, thereby to provide a wedging action between said locking means and said pin which urges said locking means firmly against said spoke within said passage means.

17. The reflector of claim 13 wherein said pin includes a surface in said passage means having a first lateral groove therein, and said locking means is formed with a second lateral groove which, with said first groove, defines a channel dimensioned to accommodate said spoke when said locking means is engaged with said pin in said passage means.

18. The reflector of claim 17 wherein said reflective elements each includes a pair of diametrically opposed radial grooves in said peripheral edge, and further comprises alignment means for aligning said first groove with said pair of diametrically opposed radial grooves when one of said first and second ends of said pin is retained in one of said first and second sockets.

19. The reflector of claim 18 wherein said alignment means includes tongue-and-groove means in said sockets and on said pin.

20. A reflector for attachment to a spoke of a spoked wheel, comprising:
first and second reflective elements, each having a peripheral edge, and configured to form a three-dimensional reflective surface when said elements are conjoined along their respective peripheral edges, each of said reflective elements having an interior and an exterior surface;
first and second bearing members extending respectively from the interior surfaces of said first and second reflective elements so as to leave the said reflective surfaces uninterrupted;
a pin to be positioned entirely within said reflective elements having first and second ends, said first end configured to be frictionally retained in said first bearing member, said second end having a longitudinal slot therethrough terminating in a lateral passage for said spoke through the central portion of said pin, said slot dividing said second end of said pin into a pair of spaced-apart, longitudinal fingers;
a locking element configured to be positioned entirely within said reflective elements frictionally in said slot and said passages, and further configured so that insertion of said locking element into said slot and said passage provides said second end of said pin with a configuration which allows said second end of said pin to be frictionally retained in said second bearing member without interrupting the reflective surface of said reflective elements;
whereby the retention of said second end in said second bearing member urges said first and second fingers against said locking element, thereby firmly to capture said locking element therebetween.

21. The reflector of claim 20, further comprising:
a lateral groove in said passage dimensioned to accommodate said spoke; and
camming means on said pin within said passage and on said locking element, for urging said locking element firmly against said spoke as said locking element is inserted into said passage and said slot when said spoke is seated in said groove.

22. The reflector of claim 21 wherein said camming means comprises:
a first inclined surface on said locking member; and
a second inclined surface on said pin in said passage;
said first and second inclined surfaces having approximately equal angles of inclination so as to be cooperatively engageable with each other to provide a wedging action therebetween as said locking element is inserted into said passage and said slot, said wedging action being in a direction which urges said locking element toward and against said spoke.

23. The reflector of claims 20, 21 or 22, wherein said reflective elements are substantially hemispherical in configuration and define a substantially spherical reflective surface when said elements are conjoined along their respective peripheral edges.

24. The reflector of claims 20, 21 or 22 wherein said reflective elements each includes a pair of diametrically-opposed radial grooves in the peripheral edges thereof, and further comprising alignment means for (a) aligning said passage with the grooves in said first reflective element when said first end of said pin is retained in said first bearing member, and (b) aligning the grooves in said second reflective element with the grooves in said first reflective element when said second end of said pin is retained in said second bearing member.

25. The reflector of claim 24 wherein said alignment means comprises tongue-and-groove means on the exterior of said pin and in the interior of said first and second bearing members.

* * * * *